(12) United States Patent
Schmidt

(10) Patent No.: US 9,733,479 B2
(45) Date of Patent: Aug. 15, 2017

(54) OPTICAL ELEMENT AND DISPLAY DEVICE WITH SUCH AN OPTICAL ELEMENT

(71) Applicant: Carl Zeiss Smart Optics GmbH, Aalen (DE)

(72) Inventor: Eduard Schmidt, Oberkochen (DE)

(73) Assignee: Carl Zeiss Smart Optics GmbH, Aalen (DE)

( * ) Notice: Subject to any disclaimer, the term of this patent is extended or adjusted under 35 U.S.C. 154(b) by 0 days.

(21) Appl. No.: 15/024,817

(22) PCT Filed: Sep. 25, 2014

(86) PCT No.: PCT/EP2014/070552
§ 371 (c)(1),
(2) Date: Mar. 24, 2016

(87) PCT Pub. No.: WO2015/044297
PCT Pub. Date: Apr. 2, 2015

(65) Prior Publication Data
US 2016/0313557 A1 Oct. 27, 2016

(30) Foreign Application Priority Data
Sep. 27, 2013 (DE) .......... 10 2013 219 622

(51) Int. Cl.
*G02B 27/14* (2006.01)
*G02B 27/01* (2006.01)
(Continued)

(52) U.S. Cl.
CPC .......... *G02B 27/0172* (2013.01); *G02B 3/08* (2013.01); *G02B 5/09* (2013.01); *G02B 2027/0118* (2013.01); *G02B 2027/0178* (2013.01)

(58) Field of Classification Search
USPC .................................. 359/630–636
See application file for complete search history.

(56) References Cited

U.S. PATENT DOCUMENTS

| 4,220,400 | A | | 9/1980 | Vizenor |
| 4,509,825 | A | * | 4/1985 | Otto .......... F21S 11/00 160/236 |

(Continued)

FOREIGN PATENT DOCUMENTS

| EP | 0704655 A1 | 4/1996 |
| WO | 2006025317 A1 | 3/2006 |

OTHER PUBLICATIONS

International Preliminary Report on Patentability rendered by the International Bureau of WIPO for PCT/EP2014/070552, dated Mar. 29, 2016, 8 pages.

*Primary Examiner* — Mohammed Hasan
(74) *Attorney, Agent, or Firm* — Skaar Ulbrich Macari, P.A.

(57) ABSTRACT

An optical element includes a reflective Fresnel element for deflecting light bundles which are incident on the Fresnel element along a direction of incidence, into a direction of emergence. The Fresnel element includes a plurality of reflective facets arranged next to each other, which are formed curved, and in each case, comprise a first reflective section and an adjoining second reflective section. The reflectivity of the first reflective section is greater than the reflectivity of the second reflective section. The second reflective section of a first reflective facet lies in front of the first reflective section of the directly neighboring reflective facet, seen in the direction of incidence, with the result that the portion of the incident light bundle which is transmitted from the second reflective section of the first reflective facet, strikes the first reflective section of the directly neighboring reflective facet, in order to be deflected.

19 Claims, 8 Drawing Sheets

(51) Int. Cl.
*G02B 3/08* (2006.01)
*G02B 5/09* (2006.01)

(56) References Cited

U.S. PATENT DOCUMENTS

| | | | |
|---|---|---|---|
| 6,671,100 B1 * | 12/2003 | McRuer | G02B 27/0081 359/630 |
| 7,656,585 B1 * | 2/2010 | Powell | G02B 5/09 349/11 |
| 8,970,961 B2 | 3/2015 | Dobschal et al. | |
| 2004/0223113 A1 | 11/2004 | Blum et al. | |
| 2007/0008624 A1 | 1/2007 | Hirayama | |
| 2013/0250429 A1 | 9/2013 | Dobschal et al. | |
| 2014/0334007 A1 * | 11/2014 | Monreal | G02B 19/0028 359/592 |

\* cited by examiner

OPTICAL ELEMENT AND DISPLAY DEVICE WITH SUCH AN OPTICAL ELEMENT

PRIORITY

This application claims the benefit of German Patent Application No. 02013219622.9 filed on Sep. 27, 2013, which is hereby incorporated herein by reference in its entirety.

FIELD

The present invention relates to an optical element with a reflective Fresnel element for deflecting light bundles which are incident on the Fresnel element along a direction of incidence, into a direction of emergence, as well as a display device with such an optical element.

BACKGROUND

With use of conventional reflective Fresnel elements, the difficulty often arises that after deflection the total light bundle formed by the deflected light bundles has an inhomogeneous brightness distribution. Furthermore, a pure beam deflection is often not sufficient for the respective optical application.

SUMMARY

An object of the invention is to provide an improved optical element with a reflective Fresnel element for deflecting light bundles which are incident on the Fresnel element along a direction of incidence, into a direction of emergence.

The disclosure includes an optical element with a reflective Fresnel element for deflecting light bundles which are incident on the Fresnel element along a direction of incidence, into a direction of emergence, in which the Fresnel element comprises a plurality of reflective facets arranged next to each other, which are formed curved and which in each case comprise a first reflective section and an adjoining second reflective section, wherein the reflectivity of the first reflective section is greater than the reflectivity of the second reflective section and wherein the second reflective section of a first reflective facet lies in front of the first reflective section of the directly neighboring reflective facet, seen in the direction of incidence, with the result that the portion of the incident light bundle which is transmitted from the second reflective section of the first reflective facet strikes the first reflective section of the directly neighboring reflective facet, in order to be deflected.

By means of this partially transparent formation of the facets or by means of the second sections, which are both reflective and transmissive, it is advantageously achieved that the total light bundle comprises a brightness distribution which is as uniform as possible. Furthermore, a desired optical function can be provided in addition to the beam deflection by means of the curved formation of the facets. The first section of the facets can also be partially transparent (and thus both reflective and transmissive).

In the case of the optical element, the second reflective section of the reflective facet can in each case comprise a first area which adjoins the first reflective section and a second area which adjoins the first area, wherein the second area of the first facet lies in front of the first area of the directly neighboring facet, seen in the direction of incidence. Thus, a very homogeneous brightness distribution can be achieved in the deflected total light bundle. As a rule, a light bundle is thus deflected by three facets, namely by the first reflective section of the first facet, the second reflective section of the second facet which lies therebehind and the second area of the third facet which lies therebehind.

In particular, the reflectivity of the first area can be greater than the reflectivity of the second area. Thus, a very good homogeneity of the brightness distribution in the deflected total light bundle is achieved.

In the case of the optical element, each facet can in each case have a curved form, which is in each case part of a predetermined surface, wherein at least two predetermined surfaces differ in respect of their curvature profile. Thus, a curved surface is no longer reproduced by means of the facets; rather, each facet can be optimized individually, whereby the imaging property of the Fresnel element can be improved overall.

Because of the different curvature profiles of the predetermined surfaces, the curved facets cannot be compiled to form an (imaginary) continuously differentiable surface.

The predetermined surfaces cannot have any mirror or rotational symmetry. In particular, they cannot have translational symmetry.

The facets can be formed on a boundary surface of the optical element. The boundary surface can be flat or curved.

In particular, the facets are arranged such that they form a continuous surface, seen on the Fresnel element in top view. However, it is also possible for them to be spaced apart from each other and comprise gaps, seen in top view.

By a facet is meant, in particular, a piece of surface, a surface element or a surface. The piece of surface, the surface element or the surface can provide the described optical effect of the facet.

In the case of the optical element, the Fresnel element (which can also be referred to as Fresnel structure or Fresnel surface) can be formed as a buried Fresnel element. Furthermore, a face which connects two directly neighboring facets can be formed transparent, reflective or partially transparent.

Furthermore, the reflective Fresnel element can provide an imaging effect. In particular, it can for example provide a collimation effect.

The optical element can be formed from glass or plastic. Furthermore, it is possible for the optical element to be formed as a separate module which can be inserted into a further optical element (such as e.g. a lens or a spectacle lens).

The reflectivity of the first section can be as great as possible for the light bundles (for example where possible a 100% reflection).

The reflective Fresnel element can be formed such that it does not bring about a desired diffractive effect. The desired effect of the reflective Fresnel element is preferably brought about by means of reflection and transmission.

Furthermore, a display device is provided, with a holder that can be fitted on the head of a user, an image-generating module secured to the holder, which generates an image, and an imaging optical system secured to the holder, which comprises, as a spectacle lens, an optical element according to the invention and which, when the holder is fitted on the head, images the generated image such that the user can perceive it as a virtual image.

The disclosure also includes an imaging optical system comprising the spectacle lens as the only optical element. However, it is also possible for the imaging optical system to comprise, in addition to the spectacle lens, also at least one further optical element. The further optical element can be, e.g., a collimation optical system which is arranged between the spectacle lens and the image-generating module, with the result that the light bundles to the image-generating module can be coupled into the spectacle lens as collimated bundles.

The Fresnel element can be arranged in a coupling-in section and/or a coupling-out section of the spectacle lens. Light bundles from the image-generating module are coupled into the spectacle lens via the coupling-in section such that they are guided to the coupling-out section in the spectacle lens. The coupling-out section brings about the coupling-out of the light bundles such that a user, when the holder is fitted on the head, can perceive a virtual image.

The image-generating module can in particular comprise a two-dimensional imaging system, such as e.g. an LCD module, an LCoS module, an OLED module or a tilting mirror matrix. The imaging system can be self-luminous or not self-luminous.

The image-generating module can in particular be formed such that it generates a monochromatic or a multi-colored image.

The display device according to the invention can comprise further elements known to a person skilled in the art which are necessary for its operation.

It is understood that the features mentioned above and those yet to be explained below can be used not only in the stated combinations but also in other combinations or alone, without departing from the scope of the present invention.

Figure 1:
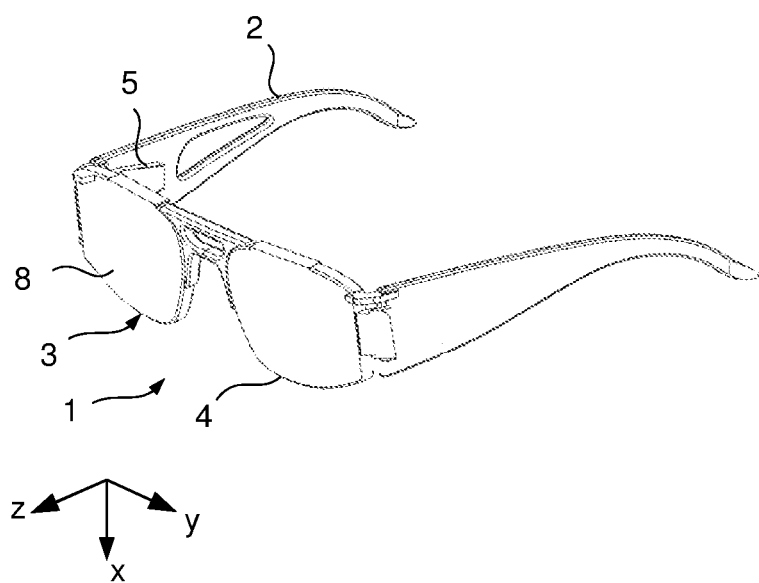
FIG. 1 is a schematic perspective representation of an embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as described below. For this purpose, the display device 1 comprises an image-generating module 5 which can be arranged in the area of the right-hand temple stem of the holder 2, as is represented schematically in FIG. 1. The image-generating module 5 can comprise e.g. a two-dimensional light modulator, such as e.g. an OLED, CMOS or LCoS chip or a tilting mirror matrix, with a plurality of pixels arranged e.g. in columns and rows.

The spectacle lenses 3 and 4, and in particular the first spectacle lens 3, are only described together with the display device 1 according to the invention by way of example. The spectacle lenses 3, 4, or at least the first spectacle lens 3, are in each case formed separately as a spectacle lens 3, 4 according to the invention or as an optical element according to the invention. The optical element according to the invention can also be used in another context than with the display device described here. Furthermore, when it is formed as a spectacle lens, the optical element, can, naturally, also be formed as a second spectacle lens 4.

Figure 2:
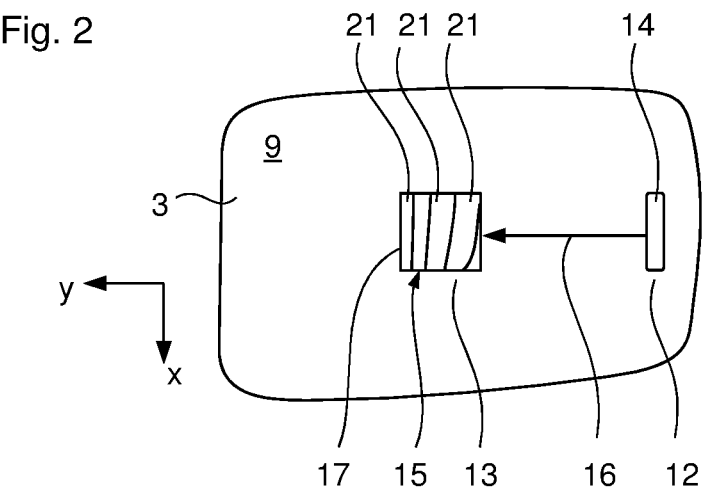
FIG. 2 is a top view of the rear side of the spectacle lens from FIG. 1.

The spectacle lens 3 comprises a front side 8 as well as a rear side 9. In FIG. 2, the spectacle lens 3 is represented in a top view onto the rear side 9, wherein a coupling-in section 14 arranged in a edge area 12 of the spectacle lens 3 and a coupling-out section 15 arranged in a central area 13 of the spectacle lens are also represented schematically. The coupling-in section 14 is formed such that light bundles which come from pixels of the two-dimensional light modulator of the image-generating module 5 are coupled into the spectacle lens 3 such that they are guided to the coupling-out section 15 by means of total internal reflection on the front and rear side 8, 9, as is indicated schematically in FIG. 2 with an arrow 16. The coupling-out section 15, which comprises a reflective Fresnel element 17 with several reflective facets 21 arranged next to each other, deflects the light beams in the direction of the eye of a user wearing the display device 1 such that they can exit the spectacle lens 3 in the direction of the eye of the user via the rear side 9 (the light beams strike the rear side 9 at an angle at which a total reflection no longer occurs).

Figure 3:
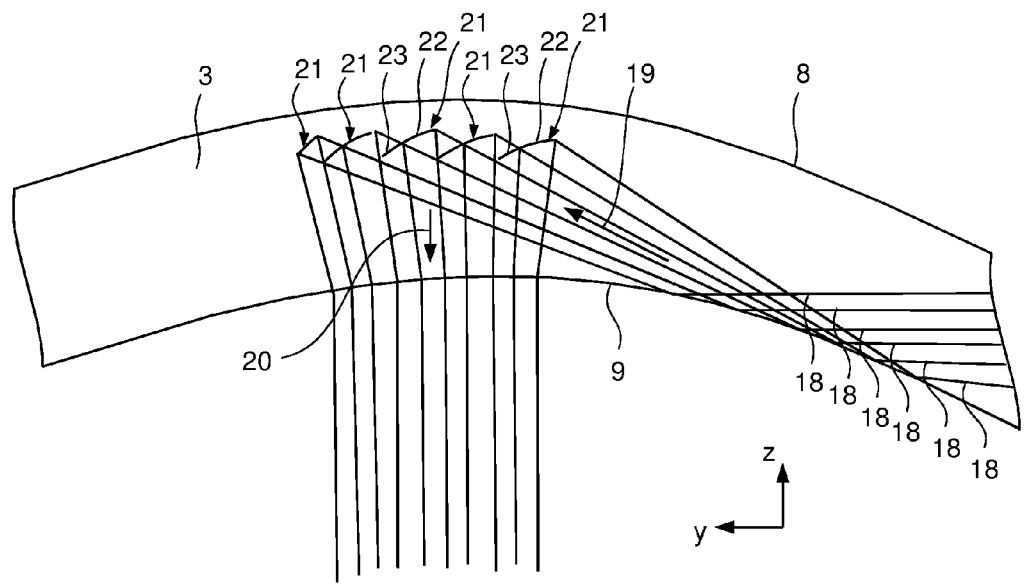
FIG. 3 is an enlarged sectional view of the coupling-out section of the spectacle lens from FIGS. 1 and 2.

In FIG. 3, an enlarged sectional view of the first spectacle lens 3 in the area of the coupling-out section 15 is shown. As can be seen from this representation, the light bundles 18 guided in the spectacle lens 3 by means of total internal reflection strike the reflective Fresnel element 17 along a direction of incidence 19 after a final total internal reflection on the rear side 9, on which a deflection occurs, such that the light bundles 18 run, along a direction of emergence 20, away from the Fresnel element 17. The direction of emergence 20 is selected such that the light bundles 18 exit the spectacle lens 3 through the rear side 9 and then run towards the eye of the user when he is wearing the display device 1.

As is shown in FIG. 3, the reflective Fresnel element 17 comprises the several reflective facets 21 arranged next to each other which are formed curved in each case. Furthermore, each reflective facet 21 comprises a first reflective section 22 and an adjoining second reflective section 23, wherein the reflectivity of the first reflective section 22 is greater than that of the second reflective section 23. In the case of the facet 21 on the far left, only the first section 22 is represented, as only this contributes to generating the virtual image during deflection. In the embodiment described here, the first reflective section can have a reflectivity which is as high as possible (for example 100%) for the light bundles 18. The reflectivity of the second reflective section 23 can be e.g. 50%, with the result that 50% of the incident light is reflected and 50% is transmitted. This has the advantageous result that, after deflection by means of the Fresnel element 17, as few as possible to no gaps are present between the deflected light bundles 18 and thus a homogeneous brightness distribution is present in the total light bundle existing by means of the deflected light bundles.

This will be explained in more detail below in connection with FIG. 4, in which three reflective facets 21 arranged next to each other (which are here referred to as first, second and third facet $21_1$, $21_2$ and $21_3$) together with the corresponding light bundles 18 are represented enlarged, when compared with FIG. 3. Furthermore, in the case of each reflective facet $21_1$-$21_3$, the first reflective section 22 is drawn with a continuous line and the adjoining second reflective section 23 with reduced reflectivity is represented with a dashed line. Furthermore, four light beams $18_1$, $18_2$, $18_3$ and $18_4$ are drawn in to represent the light bundles 18.

Figure 4:
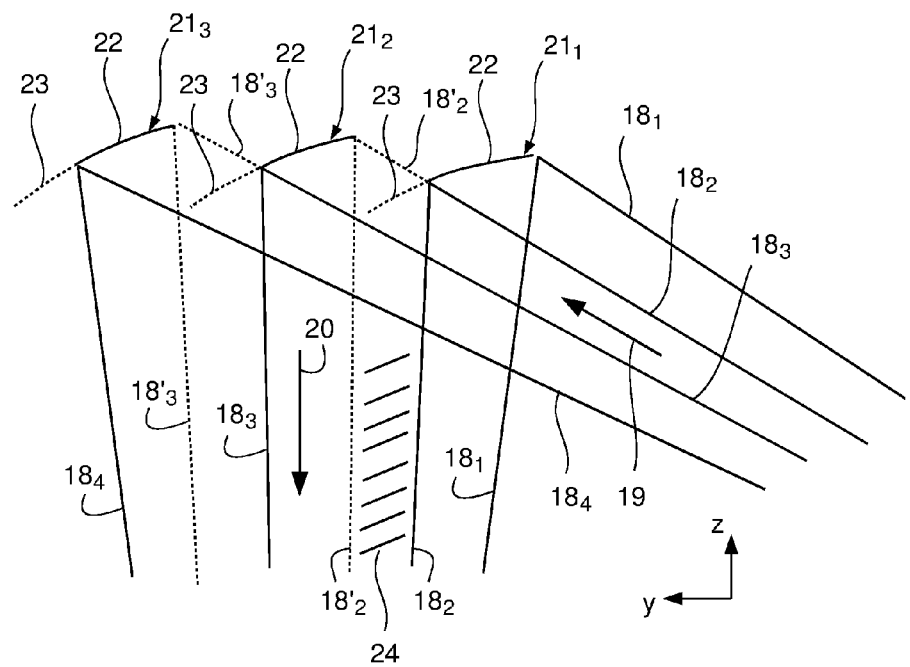
FIG. 4 is an enlarged detailed representation of the sectional view from FIG. 3.

As can be seen in the representation in FIG. 4, the second reflective section 23 of the first reflective facet $21_1$ lies in front of the first reflective section 22 of the second reflective facet $21_2$, seen in the direction of incidence 19. This now has the result that the light bundle $18_2$, which strikes precisely the start of the second reflective section 23 of the first reflective facet $21_1$, is partially deflected in the direction of the direction of emergence 20 by the second reflective section 23 and is partially transmitted as light beam $18_2'$. The transmitted light beam $18_2'$ strikes the first reflective section 22 of the second reflective facet $21_2$ which lies behind the second reflective section 23 of the first reflective facet $21_1$ and is deflected by this in the direction of the direction of emergence 20. Thus, the area 24 represented hatched is also filled with deflected light bundles 18, which would not be the case if the second reflective section 23 of the first reflective facet $21_1$ had no transmitting properties and was instead purely reflective. In the spectacle lens 3 according to the invention the section (second reflective section 23) of the reflective facet 21 is thus formed partially reflective and partially transparent, which section would result in a shadowing of the reflective facet 21 which lies behind it in the case of the predetermined direction of incidence 19. Thus, the undesired gaps after deflection can be avoided or filled with the correspondingly deflected light bundles.

This effect will be illustrated again below by reference to FIGS. 5 and 6, wherein in these representations, in order to simplify the representation, the facets 21 are represented as flat facets. In fact, however, they are formed curved.

Figure 5:
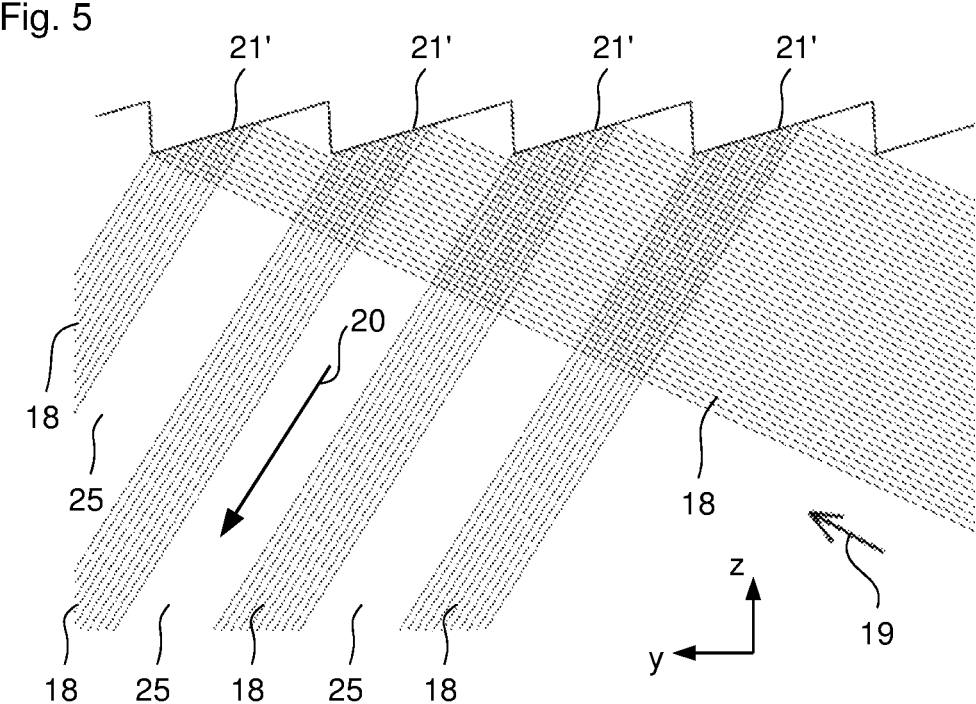
FIG. 5 is a sectional view of a conventional Fresnel element.

In the representation shown in FIG. 5, the facets 21' are formed completely as reflective facets. Large gaps 25 are present between the deflected light bundles due to the mentioned shadowing.

Figure 6:
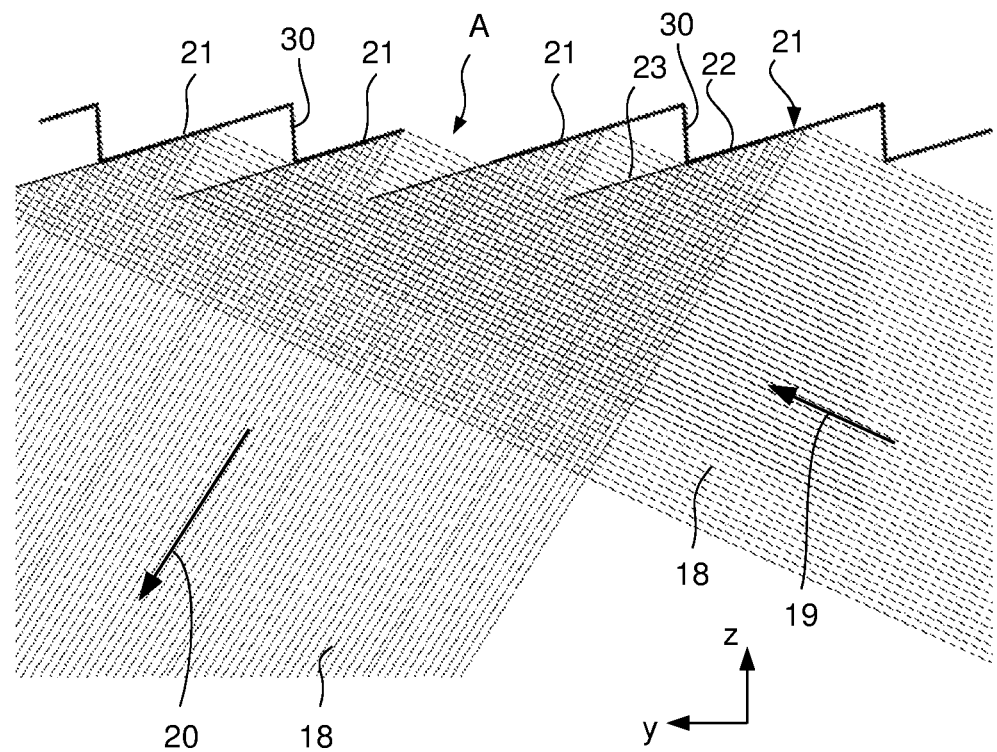
FIG. 6 is a sectional view according to FIG. 5 to explain the Fresnel element according to the invention.

However, according to the invention, the sections of the facets 21, which result in the undesired shadowing and thus in the undesired gaps 25, are formed as partially transparent facet sections 23, with the result that after deflection by means of the Fresnel element 17, there are no longer any gaps present between the individual deflected light bundles (FIG. 6).

In FIG. 6, faces 30, which connect neighboring facets 21, are also drawn in. These faces can be formed transparent. When they are transparent, they are effectively no longer present. In particular, every face 30 and the unused part of the respective facets 21 can be formed transparent, as is represented schematically in the area A.

Since the facets 21 according to the invention are formed curved, they can be used in order, for example, to realize an imaging function by means of the Fresnel element 17. Furthermore, the curved formation of the facets 21 can be used in order to compensate for or to correct any imaging errors in the imaging of the generated image as virtual image. Thus, because of the total internal reflection when the light bundles are guided in the spectacle lens 3, aberrations such as e.g. astigmatism and coma can occur. In particular, such aberrations can occur in the case of the curved formation of the front and/or rear side 8, 9. This can be corrected by means of a suitable curvature formation of the individual facets 21.

The curvature of the facets 21 does not have to be the same for all facets 21. At least two facets 21, several facets 21 or also any facet 21 can have a different individual curvature.

Furthermore, it is also possible for the first reflective sections 22 not to be purely reflective, but rather to allow a degree of transmittance. This can be used e.g. so that the surroundings can also be perceived by the user through the first reflective section 22, when the display device 1 is fitted on. In this case, the virtual image can be represented superimposed on the surroundings.

If no superimposition on the surroundings is desired, it must be ensured that light is blocked from the surroundings, because otherwise it will be irradiated into the eye by means of the partially transparent facet areas.

Figure 7:
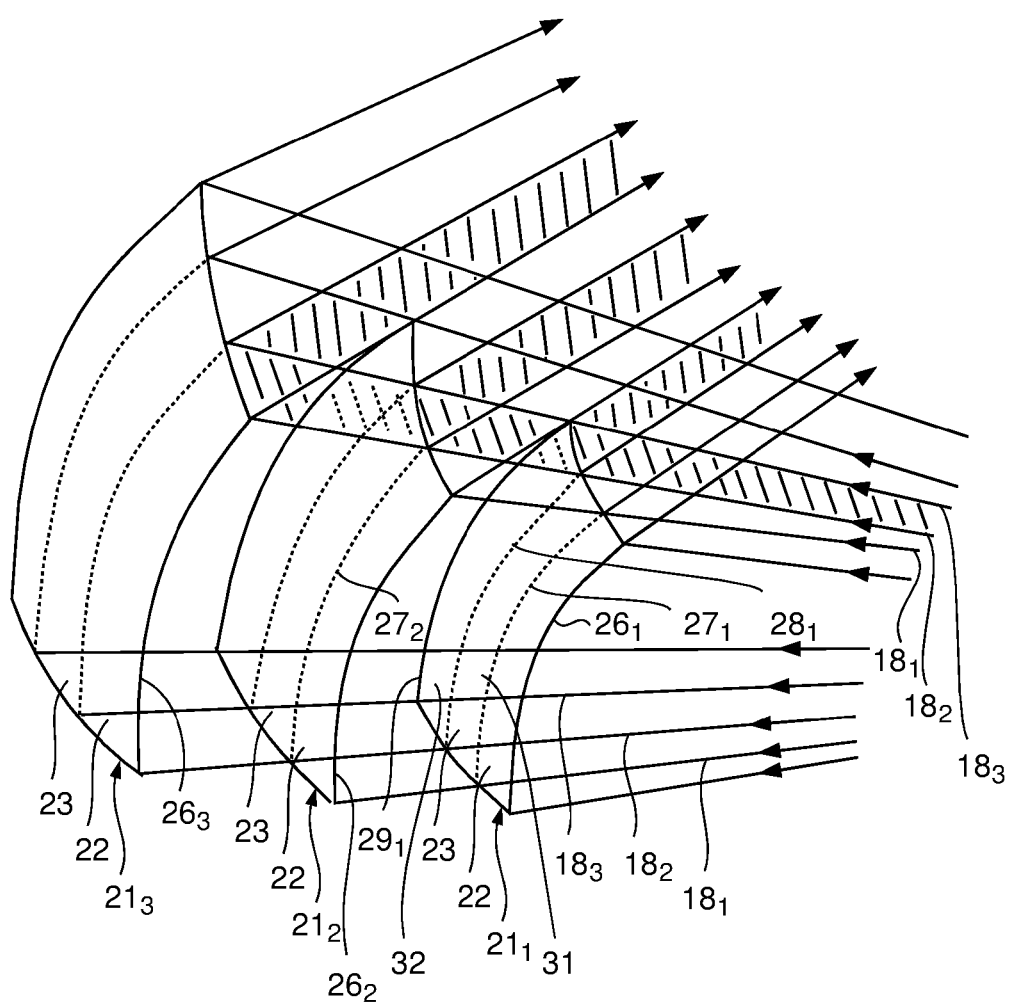
FIG. 7 is a perspective view of a further embodiment of the optical element according to the invention.

In FIG. 7, a further embodiment of the optical element 3 according to the invention with three schematically represented reflective facets $21_1$, $21_2$ and $21_3$ is shown in perspective. The form and location of the facets $21_1$-$21_3$ can be determined, for example, as follows. Beams $18_1$, which strike the lower edge $26_2$ of the second facet $21_2$, determine the boundary or boundary line $27_1$ between the first reflective section 22 and the second reflective section 23 of the first reflective facet $21_1$. Beams $18_2$, which strike the lower edge $26_3$ of the third facet $21_3$, determine the boundary or boundary line $27_2$ between the first and second reflective section 22 and 23 on the second reflective facet $21_2$ as well as an upper boundary or upper boundary line $28_1$ on the first reflective facet $21_1$.

Beams $18_3$, which are reflected on the lower edge $26_3$ of the third facet $21_3$, must touch the upper edge $29_1$ of the first facet $21_1$ and, where possible, have the same direction as the beams which are reflected on this upper edge $29_1$ of the first facet $21_1$. The portion of the light bundle 18 which is reflected by the upper partial area 32 of the second reflective section 23 of the first facet $21_1$ (hatched) must adjoin the portion which is reflected by the first reflective section 22 of the second facet $21_2$. The upper partial area 32 of the second reflective section 23 is the area between an upper boundary $28_1$ and the upper edge $29_1$. The upper boundary $28_1$ is defined by the beam $18_2$ which strikes the lower edge $26_3$ of the third facet $21_3$. The area between the upper boundary $28_1$ and the lower boundary $27_1$ can be referred to as the lower partial area 31 of the second reflective section 23.

On the basis of these conditions it is possible to determine the form and position of the facets 21 and the location of the boundaries 27, 28 for a light bundle (e.g. for a central light bundle 18). All facets 21 and all boundary lines 27, 28 can be different. When all bundles from the object field are taken into account in this way, it can also result in an alteration of the contours of the facets 21 and boundary lines. This depends on the constraints of the specific use. This can result in gaps and also in an inhomogeneous brightness distribution in the light after deflection. However, this is always much less than would be the case without the partially reflective sections 23, as is shown in connection with FIGS. 5 and 6.

The hatched area of irradiated bundles shows the distribution of light on semitransparent facet parts and the compiling to form a gap-free total bundle after deflection on the Fresnel element 17.

Figure 8:
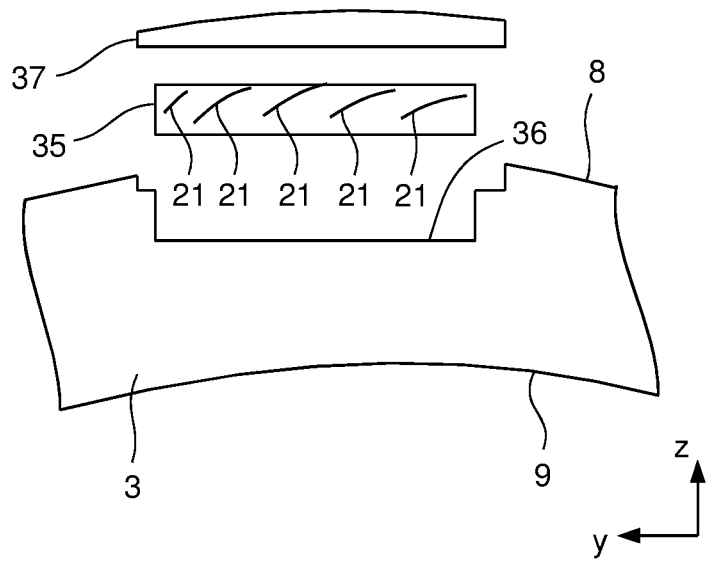
FIGS. 8 and 9 are sectional views of the spectacle lens to explain the production of the spectacle lens.
Figure 9:
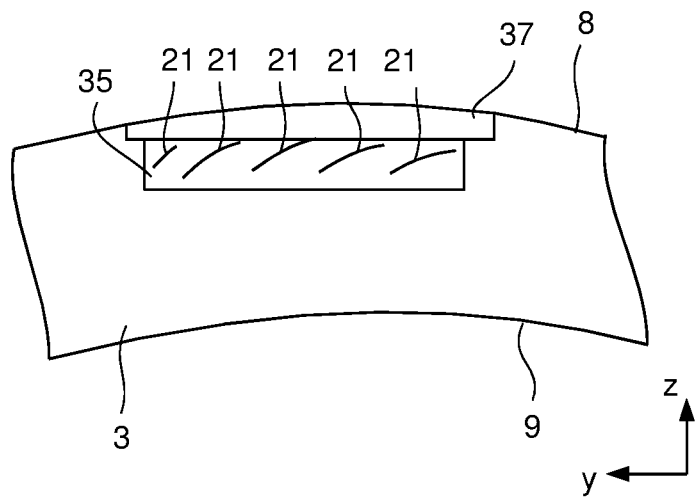

The Fresnel element 17 can be produced as a separate module 35, as is represented schematically in FIG. 8. The module 35 can have a simple outer form, such as e.g. a disk, a cuboid etc. A corresponding recess 36 is then formed in the spectacle lens 3, wherein an end element 37 can also be provided, with the result that after inserting the module 35 into the recess 36 and subsequently positioning the end element 37, the desired continuous front side 8 is present (FIG. 9). The material of the module 35 can be the same material as that of the spectacle lens 3. It is also possible to use a different material. A glass material or a plastic material is preferably used.

Figure 10:
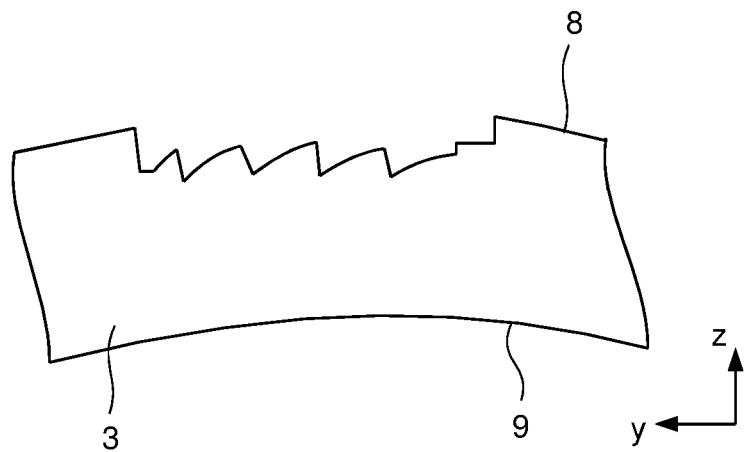
FIGS. 10-13 are sectional views to explain a further possibility to produce the spectacle lens.

Furthermore, it is possible to produce the Fresnel element 17 directly in the spectacle lens 3. For this, the form of the facets is initially produced in the spectacle lens 3, as is shown in FIG. 10. This can e.g. be carried out by means of a material removal process or a casting process with a corresponding form.

Figure 11:
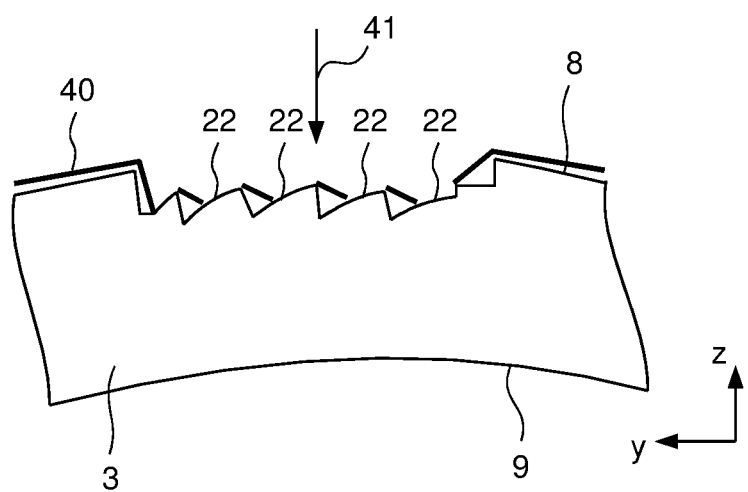

Next, a first mask 40 is arranged and the first reflective sections 22 are coated, as is indicated with the arrow 41 in FIG. 11.

Figure 12:
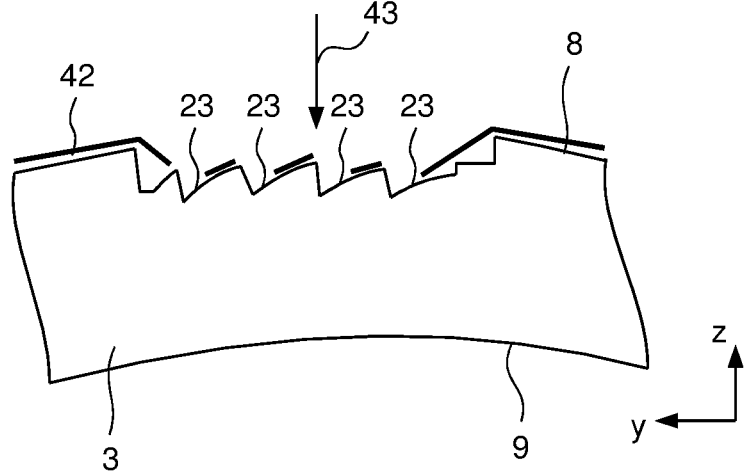
Figure 13:
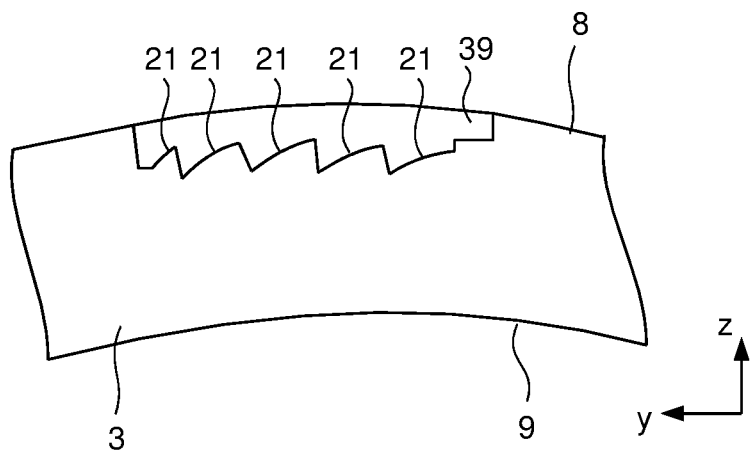

After removing the first mask 40, a second mask 42 (FIG. 12) is arranged, which masks the first reflective sections 22. The second reflective sections 23 are formed with the coating (arrow 43) which now follows. After removing the second mask 42, the area can be filled to the front side in a suitable manner. For example, a transparent liquid 39 (e.g. resin) can be poured over the Fresnel element 17, which transparent liquid is then cured. Then, a corresponding processing method as well as a grinding process or another process can follow in order to form the desired front side 8 (FIG. 13).

Figure 14:
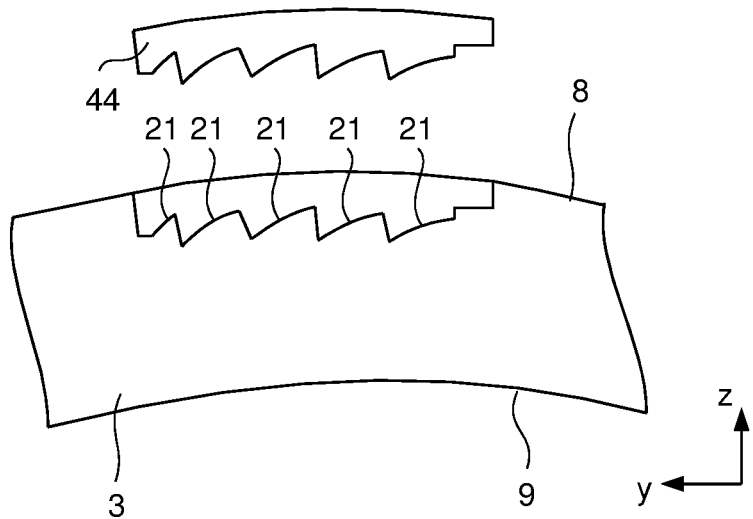
FIG. 14 is a sectional view to explain an alternative production variant.

Alternatively, it is possible to form a complementary part 44 and to insert it, with the result that the desired front side 8 is formed, as is indicated in FIG. 14.

Figure 15:
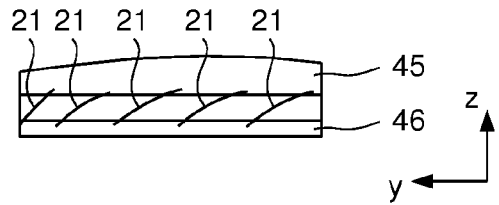
FIGS. 15-18 are sectional views to explain a further possibility to produce the spectacle lens according to the invention.

Furthermore, it is possible to produce the facets 21 from a film. This comprises a special pattern with the mirroring and semitransparent areas. The individual reflective facets 21 are cut out from such a foil and secured between two free-form plates 45, 46 (FIG. 15). These can be secured such that the films or facets 21 are deformed correspondingly. It is also possible to deform the films-facets 21 before securing is carried out. For this, it is possible to carry out e.g. a controlled softening (e.g. by heating, applying a solvent, etc.) with subsequent placement or application on a mold on which a solidification then occurs (e.g. by cooling, discharge of the solvent, etc.).

Figure 16:
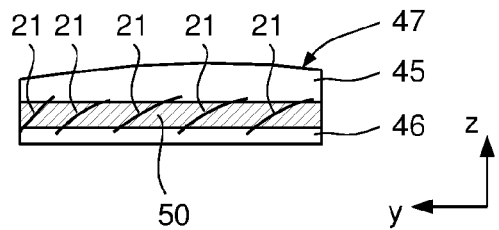

After securing the films-facets in the two free-form plates 45, 46, the space between the plates 45, 46 and the films-facets 21 is filled with a liquid 50 (indicated with hatching) and sealed (FIG. 16). For example, a liquid which can be hardened (e.g. resin) can be used in order to avoid practical disadvantages of using liquids.

Figure 17:
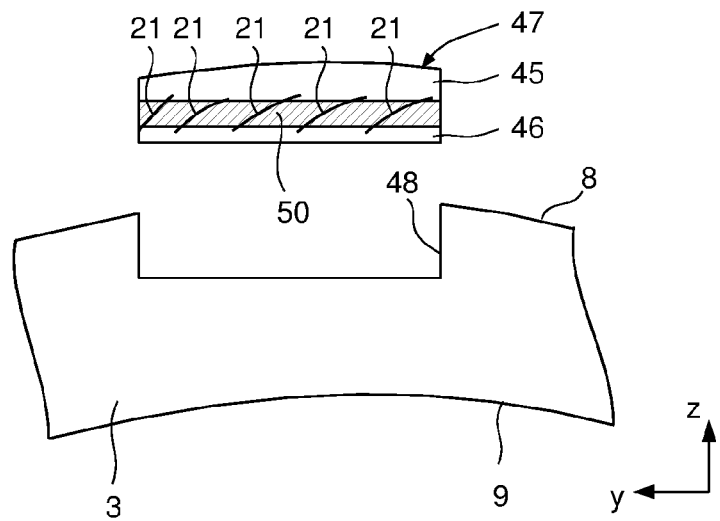
Figure 18:
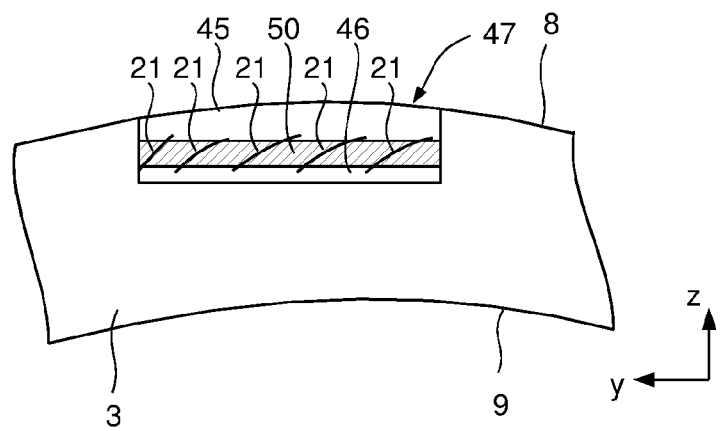

The module 47 thus produced is then inserted into a corresponding recess 48 (FIG. 17) in the spectacle lens 3 and secured in a suitable manner (e.g. cemented), in order to form the finished spectacle lens 3 (FIG. 18). Naturally, the plates 45, 46 do not have to be free-form plates. On the one hand, this can e.g. depend on the desired use. On the other hand, cuboidal plates can e.g. also be used and, in the same manner as with the embodiment according to FIGS. 8 and 9, a suitable end element 37 can be used.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical element, comprising:
   a reflective Fresnel element that deflects a light bundle which is incident on the Fresnel element along a direction of incidence into a direction of emergence, wherein the Fresnel element comprises a plurality of reflective facets arranged next to each other, and which are each formed curved and wherein each comprise a first reflective section and an adjoining second reflective section,
   wherein a reflectivity value of the first reflective section is greater than a reflectivity value of the second reflective section, and
   wherein the second reflective section of a first reflective facet lies in front of the first reflective section of a directly neighboring reflective facet, seen in the direction of incidence, such that a portion of the incident light bundle which is transmitted from the second reflective section of the first reflective facet, strikes the first reflective section of the directly neighboring reflective facet, in order to be deflected.

2. The optical element according to claim 1, wherein the second reflective section of each of the reflective facets comprises a first area which adjoins the first reflective section, and a second area which adjoins the first area, wherein the second area of the first facet lies in front of the first area of the directly neighboring facet, seen in the direction of incidence.

3. The optical element according to claim 2, wherein the curved form of the facets is in each case part of a predetermined surface, wherein at least two predetermined surfaces differ in respect of their curvature profile.

4. Optical element according to claim 2, in which the reflectivity of the first area is greater than the reflectivity of the second area.

5. Optical element according to claim 4, wherein each of the curved form facets is part of a respective predetermined surface, wherein there are at least two predetermined surfaces having different curvature profiles.

6. The optical element according to claim 1, wherein each of the curved form facets is part of a respective predetermined surface, wherein there are at least two predetermined surfaces having different curvature profiles.

7. The optical element according to claim 6, wherein the Fresnel element is formed as a buried Fresnel element.

8. The optical element according to claim 1, wherein the Fresnel element is formed as a buried Fresnel element.

9. The optical element according to claim 1, wherein a face, which connects two directly neighboring facets, is formed transparent.

10. The optical element according to claim 1, wherein the reflective Fresnel element is configured to provide an imaging effect.

11. The optical element according to claim 1, wherein the reflective Fresnel element has a collimation effect.

12. A display device, comprising:
  a holder configured to be fitted on a head of a user;
  an image-generating module secured to the holder, which generates an image; and
  an imaging optical system secured to the holder, which comprises, as a spectacle lens, an optical element according to claim 10 and which, when the holder is fitted on the head, images the generated image such that the user can perceive the generated image as a virtual image.

13. The optical element according to claim 1, wherein the optical element defines a curved front surface.

14. The optical element according to claim 1, wherein the optical element defines a curved rear surface.

15. The optical element according to claim 1, wherein the optical element defines both a curved front surface and a curved rear surface.

16. The optical element according to claim 1, wherein the optical element defines a coupling-in section where the light bundle is coupled into the optical element.

17. The optical element according to claim 16, wherein the optical element is configured to guide the light bundle from the coupling-in section to the reflective Fresnel element.

18. The optical element according to claim 17, wherein the optical element defines a coupling-out section where the light bundle reflected by the reflective Fresnel element is coupled out of the optical element.

19. The optical element according to claim 1, wherein the optical element defines a coupling-out section where the light bundle reflected by the reflective Fresnel element is coupled out of the optical element.

\* \* \* \* \*